(12) United States Patent
Wei et al.

(10) Patent No.: US 10,945,136 B2
(45) Date of Patent: Mar. 9, 2021

(54) BASE STATION THAT TRANSMITS SYSTEM INFORMATION BASED ON BEAM INFORMATION AND USER EQUIPMENT

(71) Applicant: Sony Corporation, Tokyo (JP)

(72) Inventors: Yuxin Wei, Basingstoke (GB); Hideji Wakabayashi, Basingstoke (GB); Shinichiro Tsuda, Basingstoke (GB); Brian Alexander Martin, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 22 days.

(21) Appl. No.: 16/313,217

(22) PCT Filed: May 29, 2017

(86) PCT No.: PCT/EP2017/062854
§ 371 (c)(1),
(2) Date: Dec. 26, 2018

(87) PCT Pub. No.: WO2018/001663
PCT Pub. Date: Jan. 4, 2018

(65) Prior Publication Data
US 2019/0230520 A1    Jul. 25, 2019

(30) Foreign Application Priority Data
Jun. 30, 2016  (EP) .................................. 16177187

(51) Int. Cl.
*H04W 4/00*         (2018.01)
*H04W 16/28*        (2009.01)
(Continued)

(52) U.S. Cl.
CPC .......... *H04W 16/28* (2013.01); *H04B 7/0617* (2013.01); *H04W 4/025* (2013.01);
(Continued)

(58) Field of Classification Search
None
See application file for complete search history.

(56) References Cited

U.S. PATENT DOCUMENTS

2003/0050072 A1* 3/2003 Noerpel ............. H04B 7/18539
455/452.1
2010/0173660 A1* 7/2010 Liu ....................... H04W 48/16
455/501

(Continued)

FOREIGN PATENT DOCUMENTS

WO    2017/174447 A1   10/2017
WO    2018/002150 A1    1/2018

OTHER PUBLICATIONS

International Search Report dated Aug. 17, 2017 for PCT/EP2017/062854 filed on May 29, 2017, 14 pages.
(Continued)

*Primary Examiner* — Elisabeth Benoit Magloire
(74) *Attorney, Agent, or Firm* — Xsensus LLP

(57) ABSTRACT

A mobile telecommunications system anchor base station for a mobile telecommunications system is described. The mobile telecommunications system has at least one anchor cell and at least one slave cell which is associated with the anchor cell. The anchor base station has a circuitry which is configured to transmit system information based on beam information.

21 Claims, 5 Drawing Sheets

(51) Int. Cl.
*H04B 7/06* (2006.01)
*H04W 36/00* (2009.01)
*H04W 4/02* (2018.01)
*H04W 64/00* (2009.01)
*H04W 72/00* (2009.01)
*H04W 72/04* (2009.01)
*H04W 72/12* (2009.01)
*H04W 88/02* (2009.01)
*H04B 7/022* (2017.01)

(52) U.S. Cl.
CPC ... *H04W 36/00835* (2018.08); *H04W 64/003* (2013.01); *H04W 72/005* (2013.01); *H04W 72/046* (2013.01); *H04W 72/1263* (2013.01); *H04W 88/02* (2013.01); *H04B 7/022* (2013.01)

(56) References Cited

U.S. PATENT DOCUMENTS

| | | | |
|---|---|---|---|
| 2011/0268077 A1* | 11/2011 | Wan | H04J 11/0053 370/329 |
| 2013/0072247 A1* | 3/2013 | Park | H04B 7/043 455/513 |
| 2013/0210491 A1* | 8/2013 | Eriksson | H04W 16/24 455/562.1 |
| 2013/0322367 A1* | 12/2013 | Kang | H04W 74/006 370/329 |
| 2013/0322375 A1 | 12/2013 | Chang et al. | |
| 2015/0079945 A1 | 3/2015 | Harvey et al. | |
| 2015/0222345 A1* | 8/2015 | Chapman | H04W 36/00 370/332 |
| 2015/0373626 A1* | 12/2015 | Yi | H04W 48/20 375/132 |
| 2016/0037420 A1* | 2/2016 | Gaal | H04W 72/042 370/331 |
| 2016/0057708 A1* | 2/2016 | Siomina | H04W 52/243 455/452.2 |
| 2016/0142922 A1* | 5/2016 | Chen | H04B 7/0851 375/267 |
| 2016/0218786 A1* | 7/2016 | Mizusawa | H04L 5/0023 |
| 2016/0337916 A1* | 11/2016 | Deenoo | H04W 36/0088 |
| 2017/0331577 A1* | 11/2017 | Parkvall | H04J 11/0079 |
| 2017/0331670 A1* | 11/2017 | Parkvall | H04W 24/10 |
| 2018/0063826 A1* | 3/2018 | Kim | H04B 7/0695 |
| 2018/0084446 A1* | 3/2018 | Li | H04W 76/19 |
| 2018/0124689 A1* | 5/2018 | Frenger | H04L 25/03866 |

OTHER PUBLICATIONS

European Communication pursuant to Article 94(3) dated Oct. 14, 2019, issued in corresponding European Patent Application No. 17 725 623.7.

European Communication dated Apr. 14, 2020 in European Application No. 17 725 623.7.

* cited by examiner

BASE STATION THAT TRANSMITS SYSTEM INFORMATION BASED ON BEAM INFORMATION AND USER EQUIPMENT

CROSS-REFERENCE TO RELATED APPLICATIONS

This application is a National Stage Application based on PCT/EP2017/062854, filed on 29 May 2017, and claims priority to European Patent Application No. 16177187.8, filed on 30 Jun. 2016, the entire contents of which being incorporated herein by reference.

TECHNICAL FIELD

The present disclosure generally pertains to an anchor base station, a slave base station and a user equipment.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

The candidate for providing the requirements of 5G is the so-called Long Term Evolution ("LTE"), which is a wireless communication technology allowing high-speed data communications for mobile phones and data terminals and which is already used for 4G mobile telecommunications systems.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basis LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

5G technologies will allow a concept of a so-called "virtual cell" or "local cell" or the like. In this concept a cell is served by a user equipment ("UE"), e.g. a mobile phone, a computer, tablet, tablet personal computer or the like, including a mobile communication interface, or any other device which is able to perform a mobile telecommunication via, for example, LTE(-A), such as a hot spot device with a mobile communication interface. In short, the UE works dynamically as an intermediate node for establishing an indirect network connection between other UEs in the vicinity of the virtual cell or local cell and the network, and/or as an intermediate node between UEs. A function of the intermediate node on the UE may also be carried out by "virtualization". A virtual cell or local cell may communicate with UEs in unlicensed, shared licensed or licensed bands, and it back-hauls to network preferably in licensed bands.

A logical separation between control plane and user plane has been introduced in accordance with the introduction of the IP Multimedia System (IMS) for LTE, and a physical separation between control plane and user plane has been proposed as a possible solution for 5G. Since requirements for the control plane should be basically robustness and wide coverage so as to maintain the service continuity, a macro or anchor base station should provide a link to the control plane. On the other hand, a key performance of the user plane is the efficient spectrum usage in order to improve the cell capacity. However, since the requirements of the user plane highly depend on specific use case or UE capability/category, a variety of types of reception/transmission or routing methods are considered according to the respective use case or UE capability/category taking into account a concept for 5G such as "network slicing".

For the 5G technologies, it is envisaged that a UE in the function as virtual cell should be able to take over responsibilities, which are typically carried out, for example, in a base station, or eNodeB (Evolved Node B) as it is called in LTE (the eNodeB is the element in the evolved UTRA of LTE, the UTRA being the UMTS Terrestrial Radio Access). Such responsibilities which are envisaged to be performed in the UE as a virtual cell are, for example, radio resource management, radio resource control ("RRC"), connection control, etc. Hence, it is not solely relied on the eNodeB or a small cell to relay data and to organize the local network, but such functions are shifted to the UE function as a virtual cell. The existence of such intermediate nodes of virtual cells in the network are expected to offload signalling overhead from the eNodeB, to allocate radio resource efficiently, etc.

Moreover, beamforming technology is envisaged to be used in 5G, for example, for improving spectral efficiency, for managing mobility, etc. Beamforming may also be used with the introduction of mmWave cells.

Although there exist signaling techniques for the future 5G technology, it is generally desirable to improve the signaling.

SUMMARY

According to a first aspect, the disclosure provides a mobile telecommunications system anchor base station for a mobile telecommunications system including at least one anchor cell and at least one slave cell being associated with the anchor cell, the anchor base station comprising circuitry being configured to transmit system information based on beam information.

According to a second aspect, the disclosure provides a mobile telecommunications system slave base station for a mobile telecommunications system including at least one anchor cell and at least one slave cell being associated with the anchor cell, the slave base station comprising circuitry being configured to transmit system information based on beam information.

According to a third aspect, the disclosure provides a user equipment being connectable to at least one anchor cell and at least one slave cell of a mobile telecommunications system, the mobile telecommunications system comprising the anchor cell being configured to communicate with at least one user equipment and at least one slave cell, the at least one slave cell being established by a slave base station and being configured to communication with at least the user equipment and the anchor base station, the user equipment comprising a circuitry being configured to obtain geolocation information of the user equipment; and to receive system information from a specific beam based on the geolocation information.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
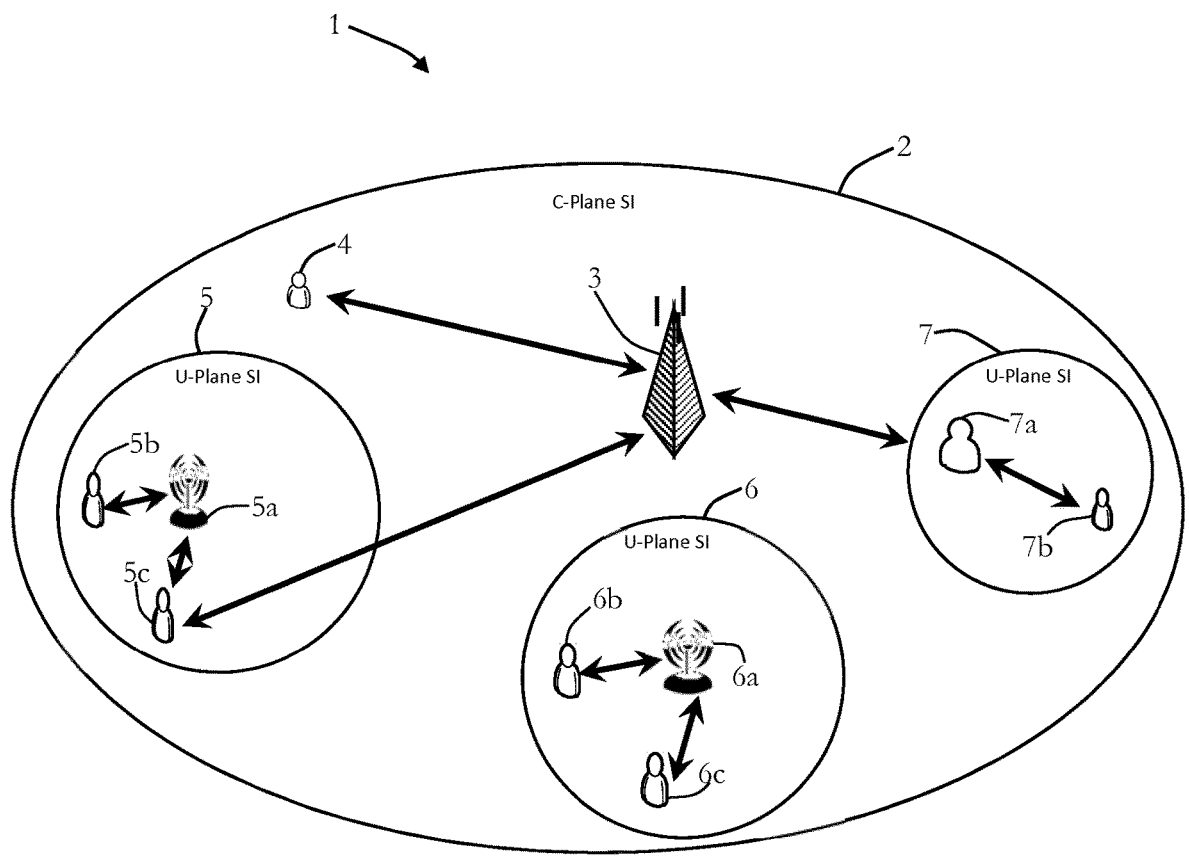
FIG. 1 illustrates a radio access network with a control plane cell, user plane cells and a virtual cell.

Before a detailed description of the embodiments under reference of FIG. 1, general explanations are made.

As mentioned in the outset, several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

As discussed, the candidate for providing the requirements of 5G is the so-called Long Term Evolution ("LTE"), which is a wireless communication technology allowing high-speed data communications for mobile phones and data terminals and which is already used for 4G mobile telecommunications systems.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation "3G") network technologies.

LTE is standardized under the control of 3GPP ("3rd Generation Partnership Project") and there exists a successor LTE-A (LTE Advanced) allowing higher data rates than the basis LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

5G technologies will allow a concept of a so-called "virtual cell" or "local cell" or the like. In this concept, a cell is served by a user equipment ("UE"), e.g. a mobile phone, a computer, tablet, tablet personal computer or the like including a mobile communication interface, or any other device which is able to perform a mobile telecommunication via, for example, LTE(-A), such as a hot spot device with a mobile communication interface. In short, the UE works dynamically as an intermediate node for establishing an indirect network connection between other UEs in the vicinity of the virtual cell or local cell and the network, and/or as an intermediate node between UEs. A function of the intermediate node on the UE may also be carried out by "virtualization". A virtual cell or local cell may communicate with UEs in unlicensed, shared licensed or licensed bands, and it back-hauls to network preferably in licensed bands.

A logical separation between control plane and user plane has been established in accordance with the introduction of the IP Multimedia System (IMS) for LTE, and a physical separation between control plane and user plane has been proposed as a possible solution for 5G. Since requirements for the control plane should be basically robustness and wide coverage so as to maintain the service continuity, a macro or anchor base station should provide a link to the control plane. On the other hand, a key performance of the user plane is the efficient spectrum usage in order to improve the cell capacity. However, since the requirements of the user plane are highly depending on specific use case or UE capability/category, a variety of types of reception/transmission or routing methods are considered according to the respective use case or UE capability/category taking into account a concept for 5G such as "network slicing".

For the 5G technologies, it is envisaged that a UE in the function of a virtual cell should be able to take over responsibilities, which are typically performed, for example, in a base station, or eNodeB (Evolved Node B) as it is called in LTE (the eNodeB is the element in the evolved UTRA of LTE, the UTRA being the UMTS Terrestrial Radio Access). Such responsibilities which are envisaged to be performed in the UE as a virtual cell, are, for example, radio resource management, radio resource control ("RRC") connection control, etc. Hence, it is not solely relied on the eNodeB or a small cell to relay data and to organize the local network, but such functions are shifted to the UE function as a virtual cell. The existence of such intermediate nodes of virtual cells in the network are expected to offload signalling overhead from the eNodeB, to allocate radio resource efficiently, etc.

Moreover, beamforming technology is envisaged to be used in 5G, for example, for improving spectral efficiency, for managing mobility, etc. Beamforming may also be used with the introduction of mmWave.

The following description will exemplary refer to LTE (Long Term Evolution) technology, in order to explain the embodiments of the present disclosure. However, the skilled person will appreciate that the present disclosure is not limited to LTE. Moreover, although the present description generally refers to "LTE", the skilled person will appreciate that "LTE" shall cover also more advanced versions of LTE, such as LTE-A (LTE advance), LTE-B, which is not yet standardized, but under development, etc. All those versions are referred to as "LTE" in the following.

The inventors recognized that by introducing a beam information into the system information, the signaling can be improved.

Accordingly, some embodiments pertain to a mobile telecommunications system anchor base station for a mobile telecommunications system including at least one anchor cell and at least one slave cell being associated with the anchor cell, the anchor base station comprising circuitry being configured to transmit system information based on beam information.

Generally, the transmission of information, such as of the system information, may include at least one of broadcasting the (system) information and providing the (system) information via a dedicated signaling.

The mobile telecommunications system may be based on the principles of the LTE technology. The mobile telecommunications system includes at least one anchor cell, being established e.g. by the anchor base station, and at least one slave cell being associated with the anchor cell and being established, for example, by a slave base station. As mentioned herein, the anchor cell may be a control plane cell or a macro cell or the like. The slave cell may be a user plane cell or a small cell or the like. Moreover, the user plane cell may also be a virtual cell, as discussed herein.

The anchor base station can be based on the known eNodeB of LTE, as one example. The anchor base station comprises circuitry being configured to transmit system information based on beam information. The circuitry may be configured to communicate with at least one user equipment, at least one slave cell base station and/or with at least one slave cell, and/or at least one virtual cell, as described herein. The user equipment may be, for example, a mobile phone, smartphone, a computer, tablet, tablet personal computer or the like including a mobile communication interface, or any other device which is able to perform a mobile telecommunication via, for example, LTE, such as a hot spot device with a mobile communication interface, etc.

Although herein and in the following features are described which are to be performed by a circuitry, the same features can be part of a method, which can be performed, for example, by a circuitry, such as the circuitry of the anchor base station, the circuitry of a slave base station (see description further below), the circuitry of a virtual cell (see further below), and/or the circuitry of a user equipment (see further below).

System information is a type of control information. In the current LTE, the system information is broadcasted in so-called System Information Blocks (SIB), which are, for example:

MIB (Master Information Block): physical layer information of a LTE cell, e.g. transmission bandwidth configuration, system frame number, etc.

SIB1: information regarding whether or not UE is allowed to access the LTE cell, defines scheduling of the other SIBs, and carries cell ID, SIB mapping information, etc.

SIB2: common channel and shared channel information

There exist further blocks, e.g. SIB4 to SIB19 in LTE, which are generally known.

Generally, beamforming is known and it is achieved, for example, by using multiple antennas to control the direction of a wavefront by appropriately weighting the magnitude and phase of individual antenna signals (transmit beamforming or TX beamforming). For instance, this may provide better coverage to specific areas along the edges of cells, but also specific UEs may be provided with a specific beam.

By transmitting the system information based on the beam information, for example, system information may be transmitted for a specific beam. Moreover, also an own scheduling may be provided for a specific beam.

The system information may include the beam information. The beam information may be a bit or the like, which may be included in the MIB or another portion of the system information. The beam information may be a beam index or the like, which may be an integer. Hence, for example, a user equipment may determine to receive only system information which is transmitted over a specific beam which is indicated by the beam information. The specific beam may be a beam of an anchor cell or anchor base station or it may be a specific beam of a slave cell or slave base station.

Hence, in some embodiments, the beam is a slave cell or slave base station beam, while the system information is transmitted by the anchor base station. Moreover, in some embodiments, the anchor base station transmits anchor cell specific system information and the slave base station transmits slave cell specific information.

The beam information may further include coverage information of a beam, thereby, for example, a user equipment may determine whether it is located within the coverage of the beam. Hence, the user equipment may determine only to receive system information over a specific beam.

The beam information may further include line of sight information, which may indicate whether an obstacle is between the antenna emitting a specific beam and the user equipment or not. Hence, the line of sight information may also be regarded as non-line of sight information. Such (non) line of sight information may be used in some embodiment switch from beamforming to MIMO in the case of non-line of sight.

As discussed, the beam information may identify a (specific) beam. This can be done on the basis of a beam index or the like. Moreover, beam information may include information identifying also in which slave cell or slave base station the beam is located.

The beam index can be obtained from, for example, the index of reference signal like the synchronization signal of that beam, or be configured separately by the serving base station.

The circuitry may be further configured to obtain geolocation information of a user equipment. Thereby, for example, it can be determined which beam is suitable for a user equipment being located at a location which is identified by the geolocation information.

The geolocation of the user equipment may be obtained by receiving the geolocation information from the user equipment. The user equipment may derive the geolocation information, for example, on the basis of a GPS sensor or any other location tracking technology.

The geolocation information of the user equipment may be obtained by measurement of a reference signal received from the user equipment.

In some embodiments, when the base station has knowledge of the geolocation of the user equipment, the base station configures the antenna weight in order to form a specific beam directed to the user equipment. When the base station does not have the knowledge of the geolocation of the user equipment, the base station configures the antenna weights to provide a random beam forming or sweep beam form. The beam information may include the type of beamforming, for example, to a specific user equipment direction, random beamforming, sweep, etc. When a user equipment specific beamforming is applied, the user equipment may send feedback information or training sequence (or reference signals) to the base station. When the random beamforming is applied, the user equipment may change the out-of-coverage criteria (S-criteria). When the sweep beamforming is applied, the user equipment may obtain the information about, for example, the arrival of the sweep (e.g. in the form of scheduling information, time information or the like). Then, the user equipment can be ready for receive it at the scheduled timing.

The circuitry may be further configured to transmit scheduling information based on the obtained geolocation information, the scheduling information indicating a broadcast schedule for a specific beam. Thereby, the user equipment can determine to receive only system information for the specific beam.

The circuitry may be further configured to transmit system information for a specific beam to a user equipment, the user equipment being in a radio resource control connected state. Thereby, for example, the user equipment can determine to only receive system information over the specific beam. The circuitry may be further configured to transmit the system information upon receipt of geolocation information of the user equipment. Thereby it may be ensured that a beam for transmission of system information is chosen which covers the location where the user equipment is located. The beam information may include information about the specific beam and other beams. Thus, for example, the user equipment may decide to switch to one of the other beams.

The circuitry may be further configured to transmit, e.g. broadcast and/or send dedicated neighboring cell list information indication to the user equipment. On the basis of the neighboring cells, the user equipment may determine to switch to one of the neighboring cells, for example, based on its mobility state. The mobility state of the UE is known in LTE, and it can be, for example, a normal, medium or high-mobility state.

The communication in the mobile telecommunications system may be distributed at least over a control plane and a user plane, wherein signaling is communicated over the control plane and user data are communicated over the user plane, and wherein the circuitry is further configured to transmit system information over the control plane and/or the user plane.

The at least one anchor cell may be a control plane cell and the at least one slave cell may be a user plane cell.

As indicated above, the beam information may identify a beam of the anchor cell and the beam information may include information about the beam coverage of the identified beam of the anchor cell.

The beam information may also identify a beam of the at least one slave cell and the beam information may include information about the beam coverage of the identified beam of the at least one slave cell.

The circuitry may be further configured to communicate with at least one user equipment and at least one slave cell base station.

Some embodiments pertain to a mobile telecommunications system slave base station for a mobile telecommunications system including at least one anchor cell and at least one slave cell being associated with the anchor cell, the slave base station comprising circuitry being configured to transmit system information based on beam information. Of course, explanations made above with respect to the anchor base station apply also to the slave base station and thus, repetitions are avoided in the following discussion. The communication in the mobile telecommunications system may be distributed at least over a control plane and a user plane, wherein signaling is communicated over the control plane and user data are communicated over the user plane, and wherein the circuitry is further configured to transmit system information over the user plane. The at least one anchor cell may be a control plane cell and the at least one slave cell may be a user plane cell. The system information may include the beam information. The beam information may further include coverage information of a beam. The beam information may further include line of sight information. The beam information may identify a beam. The circuitry may be further configured to obtain geolocation information of a user equipment. The geolocation of the user equipment may be obtained by receiving the geolocation information from the user equipment. The geolocation information of the user equipment may be obtained by measurement of a reference signal received from the user equipment.

The circuitry may be further configured to transmit scheduling information based on the obtained geolocation information, the scheduling information indicating a broadcast schedule for a specific beam. The circuitry may be further configured to transmit system information for a specific beam to a user equipment, the user equipment being in a radio resource control connected state. The circuitry may transmit the system information upon receipt of geolocation information of the user equipment. The beam information may include information about the specific beam and other beams. The beam information may identify a beam of the slave cell, and the beam information may include information about the beam coverage of the identified beam of the slave cell. The circuitry may be further configured to communicate with at least one user equipment and at least one slave cell base station.

Some embodiments pertain to a user equipment being connectable to at least one anchor cell and at least one slave cell of a mobile telecommunications system, the mobile telecommunications system comprising the anchor cell being configured to communicate with at least one user equipment and at least one slave cell, the at least one slave cell being established by a slave base station and being configured to communication with at least user equipment and the anchor base station, the user equipment comprising a circuitry being configured to obtain geolocation information of the user equipment; and receive system information from a specific beam, based on the geolocation information.

As mentioned, the user equipment may be, for example, a mobile phone, smartphone, a computer, tablet, tablet personal computer or the like including a mobile communication interface, or any other device which is able to perform a mobile telecommunication via, for example, LTE, such as a hot spot device with a mobile communication interface, etc.

The circuitry may be configured to receive the geolocation information, for example, from the anchor and/slave base station. The circuitry may also be configured to determine the geolocation of the user equipment, e.g. with a GPS sensor or the like.

The circuitry may determine based on the geolocation information, whether the specific beam covers the location where the user equipment is located, as also discussed above.

The circuitry may be further configured to receive system information including beam information about the specific beam. As discussed, the beam information may further include coverage information of the specific beam and/or it may further include line of sight information. The beam information may identify the specific beam, as discussed above.

The circuitry may be further configured to receive updated system information based on the beam information, as discussed.

The circuitry may be further configured to receive system information from a specific anchor cell or slave cell based on the beam information, as discussed.

The specific beam may be an anchor cell beam or a slave cell beam, as discussed.

The circuitry may be further configured to receive system information including scheduling information and to receive system information from the specific beam based on the scheduling information, as discussed.

The circuitry may be further configured to receive system information including neighboring cell list information and to switch to a neighboring cell based on the neighboring cell list information, as discussed.

Returning back to FIG. 1, there is illustrated a separation into a user plane and control plane in a RAN (Radio Access Network) 1.

Before the implementation and usage of the beam information is discussed, the overall system architecture of some embodiments is explained.

In LTE, all cells, such as Primary Cells (PCell) and Primary Secondary Cells (PSCell), will transmit the same set of system information blocks. In other words, in current LTE there is no differentiation between different cells.

In some embodiments the general idea for employing the separation into control plane and user plane is that different cells may transmit different sorts of system information in accordance with their role in the network 1.

For example, the role of a cell includes its functionality in the whole network (e.g. control plane or user plane, UE cell, i.e. virtual cell), its provided services (e.g. high data volume, low latency, mission critical, D2D ("device to device")), its working style (e.g. static, mobile, turn on/off, on demand, always on), etc. As discussed above, the terms control plane cell and user plane cell are used as examples for the more general terms "anchor cell" and "slave cell" introduced above. The division of the RAN into a control plane cell and user plane cells is a candidate architecture of the envisage 5G system.

In the following description of the embodiments under reference of the figures, the term control plane cell is used to indicate at least that the mobility management is conducted by the control plane cell and that there will be no handover between the user plane cells within the same control plane cell.

Such an architecture is shown in FIG. 1. The RAN 1 includes a control plane cell 2, wherein within the control plane cell 2 control plane system information ("C-Plane SI") is transmitted. The control plane cell 2 is established by a base station 3 (also referred to as anchor base station above), which is in the present embodiment basically an eNodeB type base station except for the principles described herein.

Within the coverage of the control plane cell 2, a UE 4 is located as well as user plane cells 5, 6 and 7, wherein the user plane cell 7 is a virtual cell in the present embodiment.

The user plane cells 5 and 6 are small cells and they are established by base stations 5a and 6a, respectively, which are both implemented as hot spots in the present case (and which can be considered as slave cell base stations in the sense as discussed above). The user plane cell 7 is established by a UE 7a (which can also be considered as a slave base station in the sense above), which is a smartphone, for example, such that a UE 7b in the user plane cell 7 can directly access the user plane 7 over the UE 7a. Such a user plane cell 7, is also referred to as "virtual cell" or "UE virtual cell". In all user plane cells 5, 6 and 7, user plane system information is broadcasted by the respective slave base stations 5a, 6a and 7a establishing the respective user plane cells 5, 6 and 7. Moreover, in each user plane cell 5, 6 and 7, further UEs 5b, 5c, 6b, 6c and 7b are located, which communicate with the respective slave base stations 5a, 6a and 7a establishing the respective user plane cells 5, 6 and 7.

The base station 3 communicates with UEs in the area of the control plane cell 2 directly, such as UE 4, which is not in a user plane cell, and UE 5c, which is in the user plane cell 5, and the base station 3 communicates with the user plane cell, e.g. user plane cell 7 in FIG. 1. Communication with a user plane cell can mean that the base station 3 communicates with all entities within a user plane cell and/or it can mean that the base station 3 communicates with the UE or base station which establishes the respective user plane cell.

Figure 2:
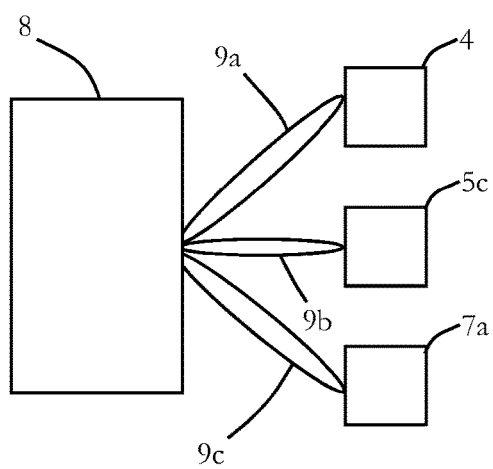
FIG. 2 illustrates beamforming of beams emitted from an antenna array.

FIG. 2 illustrates an antenna array 8, which may be employed by anyone of the anchor or slave base stations illustrated in FIG. 1, e.g. anchor cell base station 3, hot spots 5a and 6c or even by a UE, such as UE 7a, establishing a virtual cell 7.

The antenna array 8 can provide several beams by the above-mentioned beamforming, for example, beams 9a, 9b and 9c for communicating with different UEs, e.g. UEs 4, 5c and 7a.

In the following, a distributed and a centralized distribution scheme for transmission of system information is explained under reference of FIGS. 3 and 4.

Figure 3:
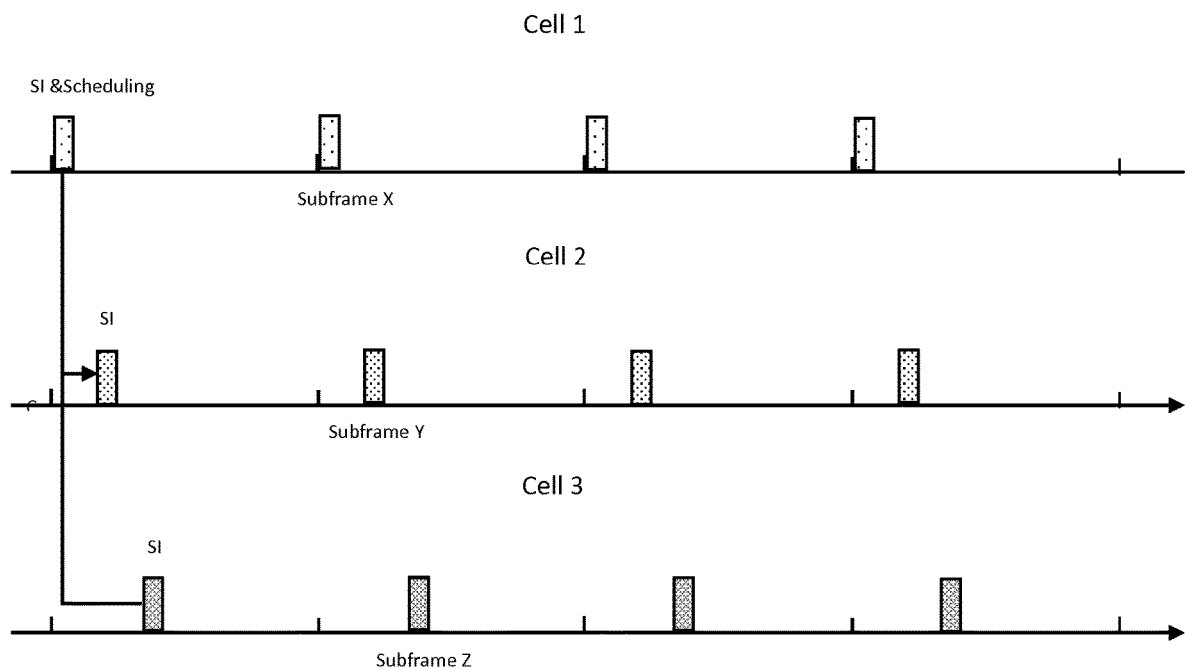
FIG. 3 illustrates a distributed approach for broadcasting system information.
Figure 4:
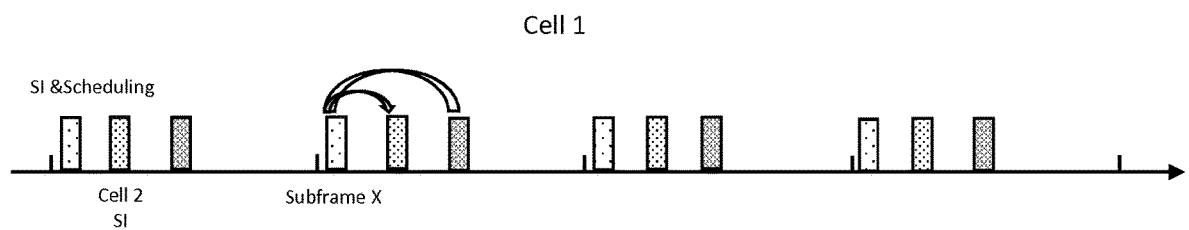
FIG. 4 illustrates a centric approach for broadcasting system information.

For the present embodiment we assume a separation of the RAN into a control plane and a user plane with a respective control plane cell, referred to as "cell 1" in FIGS. 3 and 4, and two user plane cells, referred to as "cell 2" and "cell 3". The control plane cell "Cell 1" may correspond to the control plane cell 2 of FIG. 1 above, the user plane cell "Cell 2" may correspond to the user plane cell 5 or 6 of FIG. 1 and the user plane cell "Cell 3" may correspond to the user plane cell 7 of FIG. 1, which is exemplary a UE virtual cell.

In the following, two exemplary embodiments are described which show different approaches for the transmission of control plane cell specific and user plane cell specific system information.

In a first approach, system information is transmitted in a distributed manner, as also shown in FIG. 3.

The control plane cell, as shown in the first section of FIG. 3 ("Cell 1"), indicates respective scheduling information in the system information of its associated user plane cell(s). This system information including scheduling information ("SI Scheduling") is periodically broadcasted in a subframe X.

Each user plane cell, i.e. "Cell 2" in the middle section of FIG. 3 and "Cell 3" in the lower section of FIG. 2, transmits its user plane cell specific system information by itself. Each user plane cell may have its own scheduling. In the embodiment of FIG. 3, "Cell 2" transmits its system information in the subframe Y and "Cell 3" transmits its system information in the subframe Z. The user plane cell specific system information includes, for example, service and/or slice specific configurations in the form of service/slice configuration data. As the system information of the control plane cell mainly or only contains scheduling information, the signalling overhead for the control plane cell is reduced in this embodiment. Moreover, as the service and slice specific information is broadcasted by each user plane cell individually, a single node failure problem might be avoided.

In a second approach, the layered system information is transmitted in a centralized manner, as shown in FIG. 4. In this embodiment, only the control plane cell transmits the system information including both the control plane cell specific system information including scheduling information and the user plane cell specific system information. However, the control plane cell transmits the user plane cell specific information "Cell 2 SI" and "Cell 3 SI" separated from the control plane specific system information "SI & Scheduling". The scheduling information indicates, for example, when the respective user plane cell specific system information is broadcasted.

With the introduction of the above-discussed beam information, a Tx beam index together with UE reporting of geolocation information and/or Tx beam coverage information and/or measurement based on UE reference signaling is introduced in some embodiments, which will be discussed in the following and which are based on the explanations given above, in particular, as stated above under reference of FIGS. 1 to 4. The efficiency to transmit Tx beam specific system information and to receive updated system information is improved in some embodiments. In the following, various combinations of control-plane system information (SI) scheduling information with dedicated/broadcast system information transmission are discussed.

In the next sections, embodiments are discussed, which use the distributed transmission of layered system information, as has also been explained above under reference of FIG. 3.

Figure 5:
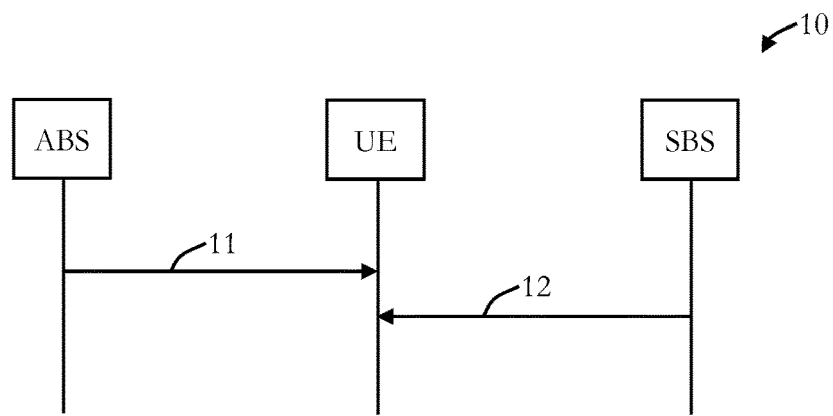
FIG. 5 shows a flow chart of a first method for broadcasting system information based on beam information.

FIG. 5 illustrates an embodiment of a method 10, wherein a user-plane or slave base station "SBS" (e.g. a TRP (transmission and reception point)) broadcasts system information and wherein scheduling information is broadcasted by a control plane or anchor base station "ABS" to a "UE".

In the system information broadcasted by the ABS at 11, beam information (e.g. beam index) and optionally a beam cover range (coordinates), together with scheduling information is included (e.g. in which subframe it will be scheduled to transmit the system information, see FIG. 3 and associated description).

The beam index indicates for example a specific beam, e.g. beam 9a in FIG. 2, which is received by UE 4 in FIG. 2. Hence, in some embodiments, the beam index may be an integer which is specific for a beam. The beam index can be specific within the coverage of the control-plane base station ("ABS") or it can be specific within the coverage of the user-plane or slave base station ("SBS"). In embodiments where the beam index is specific for the coverage of the SBS, the ABS includes the user-plane base station or slave base station identification ("ID") also in the system information broadcasted at 11. The UE can obtain such an ID over the reference signal, e.g. over a synchronization signal of a user-plane base station or a slave base station or the UE can be configured by a central node, e.g. ABS.

After the UE has received the information sent at 11, the UE considers its geolocation, which the UE knows, for example, from a GPS sensor or which it received also included in the system information and/or in the beam information.

By knowing the geolocation, the UE knows from which user-plane or slave base station SBS and over which beam it needs to receive the corresponding user-plane or slave base station specific system information, which is broadcasted by the SBS and which is received by the UE at 12.

Besides the geolocation information, a non-line of sight (NLOS)/line of sight (LOS) condition indication could be included as well, for example, in the system information broadcasted by the ABS. Other forms of indication may include a tall building indication, complex geographical environment within the beam coverage and the like. These indications can be used by the UE to determine which slave cell or slave base station and which beam is appropriate for receiving respective user plane cell specific system information.

Moreover, with this kind of indication, the UE is able to decide to switch to another transmission mode, e.g. MIMO (multiple input multiple output) or transmit diversity or the like, if necessary.

Furthermore, as mentioned, the system information broadcasted by the ABS can include scheduling information which indicates a broadcast schedule for the respective SBS which is, for example, served by the ABS.

The UE will receive the corresponding system information from the SBS (user-plane node or slave base station) in accordance with the broadcast schedule. The user cell specific system information received from the SBS may also include configuration information about the beam, e.g. beam related resource configurations, beam bandwidth configurations, etc.

Figure 6:
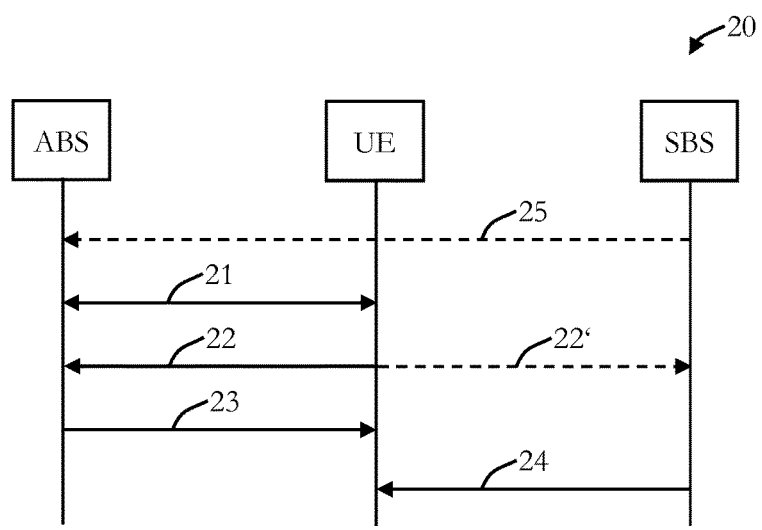
FIG. 6 shows a flow chart of a second method for broadcasting system information based on beam information.

FIG. 6 illustrates an embodiment of a method 20, wherein the user-plane or slave node SBS, e.g. TPR (transmission and reception point), broadcasts SBS specific system information and wherein the control plane base station ABS transmits dedicated scheduling information.

If the UE is in a RRC_CONNECTED state at 21 with the ABS, it will report its geolocation to the control-plane node ABS at 22.

The control-plane node ABS will check which TRP and associated beam could cover the UE and then the ABS will send corresponding scheduling information of that TRP and the associated beam information (e.g. beam index as discussed above) to the UE at 23.

The UE will receive corresponding system information on the scheduled transmission opportunities form the SBS at 24.

Alternatively, the control-plane node ABS receives a measurement report and/or geolocation information from the UEs in certain beams at 22 or the measurement repot and/or geolocation information is forwarded by the corresponding user-plane or slave node SBS at 25, which has been received from the UE at 22'.

Then, together with the new reported geolocation of the UE, the control-plane ABS decides which user-plane or slave base station is suitable for this UE and reports this accordingly at 23, as discussed above.

Figure 7:
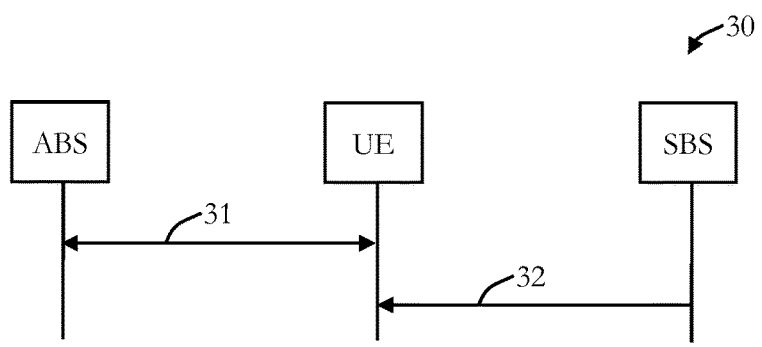
FIG. 7 shows a flow chart of a third method for broadcasting system information based on beam information.

FIG. 7 illustrates an embodiment of a method 30, wherein the user-plane or slave node SBS, e.g. TPR (transmission and reception point), broadcasts SBS specific system information and wherein no scheduling information is transmitted by the control-plane node ABS.

In the case that the user-plane or slave node specific system information scheduling information is not present or unknown by the control-plane ABS, the UE should know the system information transmission opportunities of all the nodes or base stations including the control-plane base station and the user-plane or slave base stations. Moreover, the UE should know the transmission beams.

After consulting the control-plane node ABS at 31 as to which one of the target transmission (TX) beams the appropriate beam is, which may be indicated by the ABS with the beam index in the system information as discussed above, the UE determines based on its geolocation from which user-plane or slave base station SBS the system information is read.

At 32, the UE receives the respective system information from the SBS. As a further optimization, the beam index is included in the MIB of the system information. Based on the beam index, the UE would determine whether it reads the following SIB 1 and other SIBs or not.

Figure 8:
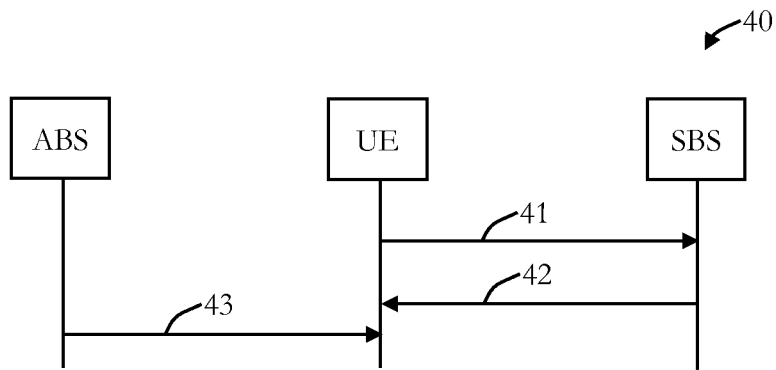
FIG. 8 shows a flow chart of a fourth method for broadcasting system information based on beam information.

FIG. 8 illustrates an embodiment of a method 40, wherein the user-plane or slave node SBS transmits dedicated system information in a corresponding beam.

If the UE is in RRC_CONNECTED state, it could receive the corresponding system information from the specific transmission beam from the SBS at 42.

The transmission can be triggered, for example, by the UE reporting its geolocation and/or service request at 41.

In addition to the preferred beam, which is indicated by the beam information (e.g. beam index, as discussed above), the ABS at 43 and/or the SBS at 42 could send neighbor cell information or neighbor beam information as well as system information of the neighbor cell and/or neighbor beam including system information scheduling information.

With this information, the UE could measure the reference signal of neighbor cells and/or neighbor beams and according to the measurement result, the UE can then select/switch to a better beam according to its mobility state. The mobility state of the UE can be a normal, medium or high-mobility state as it is known according to the LTE standard.

Figure 9:
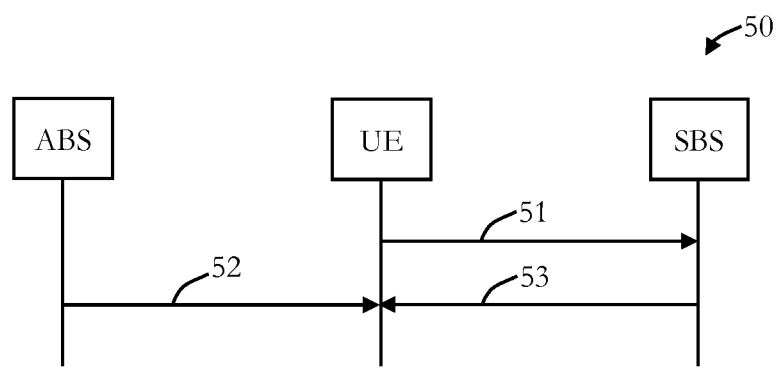
FIG. 9 shows a flow chart of a fifth method for broadcasting system information based on beam information.

FIG. 9 illustrates an embodiment of a method 50, wherein the user-plane or slave node SBS, e.g. TRP, measures an uplink signal from the UE for determining its location at 51. Hence, no reporting from the UE is required.

A system information update can be indicated either by the control-plane central node at 52, and can updated by a group of TRPs using dedicated signaling, or it can be just sent by the group of TRPs currently serving the UE at 53.

Delta signaling which indicates the differences between old and updated system information is supported as well. The control-plane node ABS provides enough information to the UE, e.g. at 52, such that the UE is able to send the uplink signal. Then, the distributed nodes can perform the remaining steps.

In the following, embodiments using a centralized transmission of system information, for example, as explained under reference of FIG. 4 above, are discussed.

Figure 10:
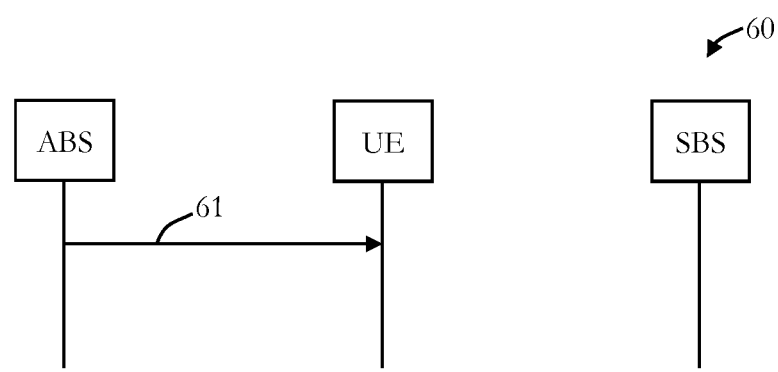
FIG. 10 shows a flow chart of a method for broadcasting system information based on beam information in centralized approach.

In the centralized transmission scheme, the control-plane node ABS transmits the system information also of the user-plane or slave node SBS, as illustrated at 61 of a method 60 shown in FIG. 10, which includes beam information, e.g. a beam index, as discussed above.

In some embodiments, the ABS establishes a mmWave cell, which can work, for example, in a standalone manner, such that such an ABS is treated as a control-plane cell.

In that case, the above methods of FIGS. 5 to 9 can be applied with the difference that the ABS (mmWave cell) broadcasts the system information and also the system information scheduling information.

Under reference of FIG. 10, embodiments are explained which pertain to a system information update performed with beamforming.

Figure 11:
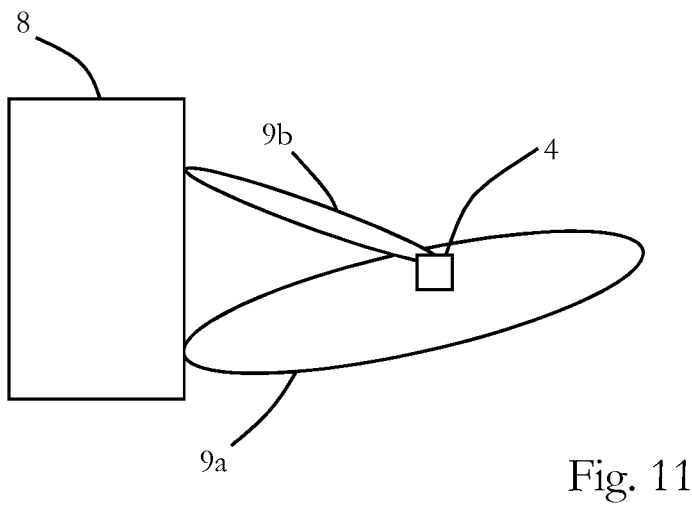
FIG. 11 illustrates system information update based on beam information.

FIG. 11 is similar to FIG. 2 and it illustrates a situation where an antenna array 8 emits two beams 9*a* and 9*b*, wherein a UE 4 is within the coverage of the first beam 9*a* and wherein the second beam 9*b* has a small coverage of the UE 4.

The embodiments discussed below address an unnecessary energy consumption of the UE 4 for receiving irrelevant updated system information. For example, UE 4, which is in the coverage of the first beam 9*a*, does not necessarily have to receive the updated system information of the second beam 9*b* with which it only has a very small coverage.

Hence, according to a first type of embodiments, the MIB of the system information includes a modification bit for each beam index and/or the MIB includes information indicating which SIB is updated for each beam index.

For example, the modification bit will be set to "1" if the corresponding system information of a specific beam is changed. The UE will receive the MIB and will then check, whether the TX beam modification bit is set to 1 or not and can determine whether the associated system information is updated or not.

As discussed above, the system information including the modification bit and/or the information indicating which SIB is updated for each beam index can be sent by an anchor cell/control plane cell and/or slave cell/user plane cell (see also embodiments discussed above under reference of FIGS. 5 to 10 illustrating different types of system information transmission).

According to a second type of embodiments, the updated transmission beam system information will be sent to the relevant UEs with dedicated signaling, wherein delta signaling may be supported as well (see also embodiments discussed above under reference of FIGS. 5 to 10 illustrating different types of system information transmission).

As discussed, some embodiments pertain to the system information transmission/reception with beamforming for future communication systems. With the proposed schemes above, in some embodiments, the signaling overhead for receiving system information is reduced and the system information transmission/reception efficiency is improved.

Figure 12:
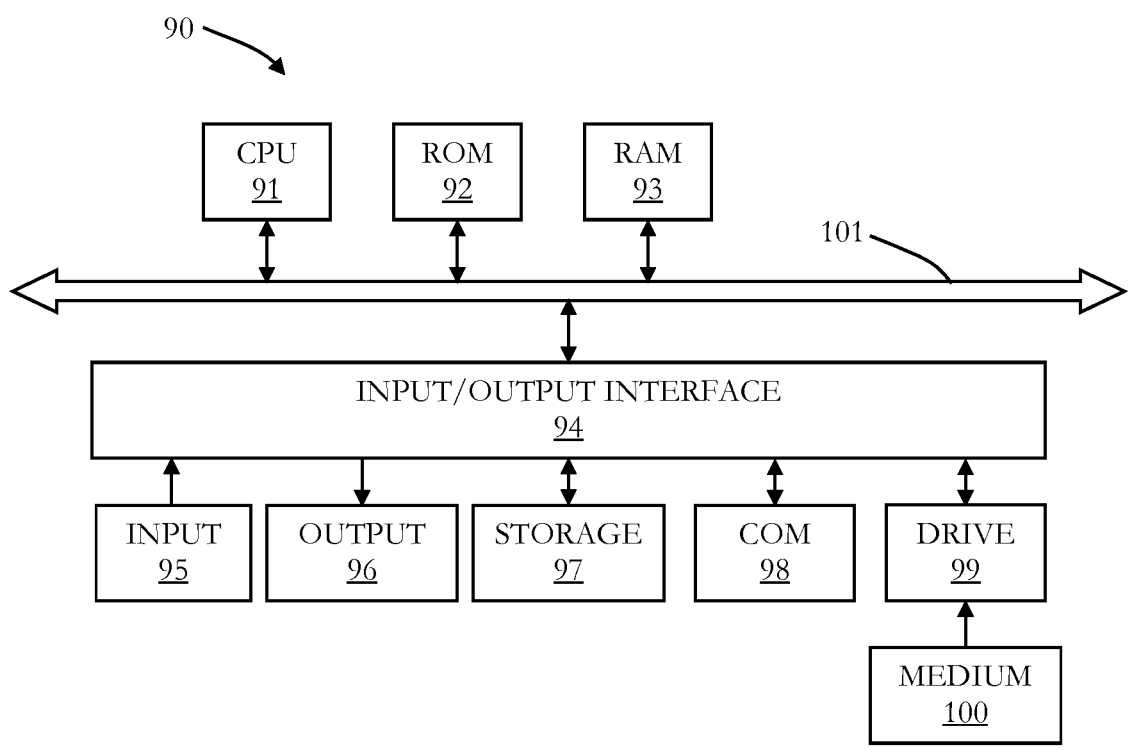
FIG. 12 shows a multi-purpose computer which can be used for implementing an anchor base station, slave base station or user equipment as disclosed herein.

In the following, an embodiment of a general purpose computer 90 is described under reference of FIG. 12. The computer 90 can be implemented such that it can basically function as any type (anchor, slave, control plane, user plane, etc.) of base station, virtual/slave cell or user equipment as described herein. The computer has components 91 to 100, which can form a circuitry, such as anyone of the circuitries of the base station, virtual cell, slave cell, and user equipment, as described herein.

Embodiments which use software, firmware, programs or the like for performing the methods as described herein can be installed on computer 90, which is then configured to be suitable for the concrete embodiment.

The computer 90 has a CPU 91 (Central Processing Unit), which can execute various types of procedures and methods as described herein, for example, in accordance with programs stored in a read-only memory (ROM) 92, stored in a storage 97 and loaded into a random access memory (RAM) 93, stored on a medium 100 which can be inserted in a respective drive 99, etc.

The CPU 91, the ROM 92 and the RAM 93 are connected with a bus 101, which in turn is connected to an input/output interface 94. The number of CPUs, memories and storages is only exemplary, and the skilled person will appreciate that the computer 90 can be adapted and configured accordingly for meeting specific requirements which arise, when it functions as a base station, virtual cell and user equipment.

At the input/output interface 94, several components are connected: an input 95, an output 96, the storage 97, a communication interface 98 and the drive 99 into which a medium 100 (compact disc, digital video disc, compact flash memory, or the like) can be inserted.

The input 95 can be a pointer device (mouse, graphic table, or the like), a keyboard, a microphone, a camera, a touchscreen, etc.

The output 96 can have a display (liquid crystal display, cathode ray tube display, light emittance diode display, etc.), loudspeakers, etc.

The storage 97 can have a hard disk, a solid state drive and the like.

The communication interface 98 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 90. Alternative configurations may be implemented with additional or other sensors, storage devices, interfaces or the like. For example, the communication interface 98 may support other radio access technologies than the mentioned UMTS and LTE.

When the computer 90 functions as a base station, the communication interface 98 can further have a corresponding air interface (providing e.g. E-UTRA protocols OFDMA (downlink) and SCFDMA (uplink)) and network interfaces (implementing for example protocols such as S1-AP, GTP-U, S1-MME, X2-AP, or the like). The present disclosure is not limited to any particularities of such protocols.

The methods as described herein are also implemented in some embodiments as a computer program causing a computer and/or a processor to perform the method when being carried out on the computer and/or processor. In some embodiments, also a non-transitory computer-readable recording medium is provided that stores therein a computer program product which, when executed by a processor, such as the processor described above, causes the methods described herein to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A mobile telecommunications system anchor base station for a mobile telecommunications system including at least one anchor cell and at least one slave cell being associated with the anchor cell, the anchor base station comprising circuitry being configured to:
transmit system information based on beam information.
(2) The mobile telecommunications system anchor base station of (1), wherein the system information includes the beam information.
(3) The mobile telecommunications system anchor base station of anyone of (1) to (2), wherein the beam information further includes coverage information of a beam.
(4) The mobile telecommunications system anchor base station of anyone of (1) to (3), wherein the beam information further includes line of sight information.
(5) The mobile telecommunications system anchor base station of anyone of (1) to (4), wherein the beam information identifies a beam.
(6) The mobile telecommunications system anchor base station of anyone of (1) to (5), wherein the circuitry is further configured to obtain geolocation information of a user equipment.
(7) The mobile telecommunications system anchor base station of (6), wherein the geolocation of the user equipment is obtained by receiving the geolocation information from the user equipment.
(8) The mobile telecommunications system anchor base station of (6) or (7), wherein the geolocation information of the user equipment is obtained by measurement of a reference signal received from the user equipment.
(9) The mobile telecommunications system anchor base station of anyone of (6) to (8), wherein the circuitry is further configured to transmit scheduling information based on the obtained geolocation information, the scheduling information indicating a broadcast schedule for a specific beam.
(10) The mobile telecommunications system anchor base station of anyone of (1) to (9), wherein the circuitry is further configured to transmit system information for a specific beam to a user equipment, the user equipment being in a radio resource control connected state.
(11) The mobile telecommunications system anchor base station of (10), wherein the circuitry transmits the system information upon receipt of geolocation information of the user equipment.
(12) The mobile telecommunications system anchor base station of (10) or (11), wherein the beam information includes information about the specific beam and other beams.
(13) The mobile telecommunications system anchor base station of anyone of (1) to (12), wherein the circuitry is further configured to transmit neighboring cell list information indicating neighboring cells.
(14) The mobile telecommunications system anchor base station of anyone of (1) to (13), wherein the communication in the mobile telecommunications system is distributed at least over a control plane and a user plane, wherein signaling is communicated over the control plane and user data are communicated over the user plane, and wherein the circuitry is further configured to transmit system information over the control plane and the user plane.
(15) The mobile telecommunications system anchor base station of (14), wherein the at least one anchor cell is a control plane cell and the at least one slave cell is a user plane cell.
(16) The mobile telecommunications system anchor base station of (14) or (15), wherein the beam information identifies a beam of the anchor cell.
(17) The mobile telecommunications system anchor base station of (16), wherein the beam information includes information about the beam coverage of the identified beam of the anchor cell.
(18) The mobile telecommunications system anchor base station of anyone of (14) to (17), wherein the beam information identifies a beam of the at least one slave cell.
(19) The mobile telecommunications system anchor base station of (18), wherein the beam information includes information about the beam coverage of the identified beam of the at least one slave cell.
(20) The mobile telecommunications system anchor base station of anyone of (1) to (19), wherein the circuitry is further configured to communicate with at least one user equipment and at least one slave cell base station.
(21) A mobile telecommunications system slave base station for a mobile telecommunications system including at least one anchor cell and at least one slave cell being associated with the anchor cell, the slave base station comprising circuitry being configured to:

transmit system information based on beam information.

(22) The mobile telecommunications system slave base station of (21), wherein the communication in the mobile telecommunications system is distributed at least over a control plane and a user plane, wherein signaling is communicated over the control plane and user data are communicated over the user plane, and wherein the circuitry is further configured to transmit system information over the user plane.

(23) The mobile telecommunications system slave base station of (22), wherein the at least one anchor cell is a control plane cell and the at least one slave cell is a user plane cell.

(24) The mobile telecommunications system slave base station of anyone of (21) to (23), wherein the system information includes the beam information.

(25) The mobile telecommunications system slave base station of anyone of (21) to (24), wherein the beam information further includes coverage information of a beam.

(26) The mobile telecommunications system slave base station of anyone of (21) to (25), wherein the beam information further includes line of sight information.

(27) The mobile telecommunications system slave base station of anyone of (21) to (26), wherein the beam information identifies a beam.

(28) The mobile telecommunications system slave base station of anyone of (21) to (27), wherein the circuitry is further configured to obtain geolocation information of a user equipment.

(29) The mobile telecommunications system base station of (28), wherein the geolocation of the user equipment is obtained by receiving the geolocation information from the user equipment.

(30) The mobile telecommunications system slave base station of (28) or (29), wherein the geolocation information of the user equipment is obtained by measurement of a reference signal received from the user equipment.

(31) The mobile telecommunications system slave base station of anyone of (28) to (30), wherein the circuitry is further configured to transmit scheduling information based on the obtained geolocation information, the scheduling information indicating a broadcast schedule for a specific beam.

(32) The mobile telecommunications system slave base station of anyone of (21) to (31), wherein the circuitry is further configured to transmit system information for a specific beam to a user equipment, the user equipment being in a radio resource control connected state.

(33) The mobile telecommunications system slave base station of (32), wherein the circuitry transmits the system information upon receipt of geolocation information of the user equipment.

(34) The mobile telecommunications system slave base station of (32) or (33), wherein the beam information includes information about the specific beam and other beams.

(35) The mobile telecommunications system anchor base station of (32), wherein the beam information identifies a beam of the slave cell.

(36) The mobile telecommunications system anchor base station of (35), wherein the beam information includes information about the beam coverage of the identified beam of the slave cell.

(37) The mobile telecommunications system anchor base station of anyone of (21) to (36), wherein the circuitry is further configured to communicate with at least one user equipment and at least one slave cell base station.

(38) A user equipment being connectable to at least one anchor cell and at least one slave cell of a mobile telecommunications system, the mobile telecommunications system comprising the anchor cell being configured to communicate with at least one user equipment and at least one slave cell, the at least one slave cell being established by a slave base station and being configured to communicate with at least user equipment and the anchor base station, the user equipment comprising a circuitry being configured to:

obtain geolocation information of the user equipment; and
receive system information from a specific beam, based on the geolocation information.

(39) The user equipment of (38), wherein the circuitry is further configured to receive system information including beam information about the specific beam.

(40) The user equipment of (38), wherein the beam information further includes coverage information of the specific beam.

(41) The user equipment of (39) or (40), wherein the beam information further includes line of sight information.

(42) The user equipment of anyone of (39) to (41), wherein the beam information identifies the specific beam.

(43) The user equipment of anyone of (39) to (42), wherein the circuitry is further configured to receive updated system information based on the beam information.

(44) The user equipment of anyone of (39) to (43), wherein the circuitry is further configured to receive system information from a specific anchor cell or slave cell, based on the beam information.

(45) The user equipment of anyone of (38) to (44), wherein the specific beam is an anchor cell beam or slave cell beam.

(46) The user equipment of anyone of (38) to (45), wherein the circuitry is further configured to receive system information including scheduling information and to receive system information from the specific beam, based on the scheduling information.

(47) The user equipment of anyone of (38) to (46), wherein the circuitry is further configured to receive system information including neighboring cell list information and to switch to a neighboring cell based on the neighboring cell list information.

The invention claimed is:

1. A mobile telecommunications system anchor base station for a mobile telecommunications system including at least one anchor cell and at least one slave cell being associated with the anchor cell, the anchor base station comprising circuitry being configured to:

transmit system information for a specific beam based on beam information, the specific beam to be used to transmit data between the anchor base station and the at least one slave cell.

2. The mobile telecommunications system anchor base station of claim 1, wherein the system information includes the beam information.

3. The mobile telecommunications system anchor base station of claim 1, wherein the beam information further includes coverage information of the beam.

4. The mobile telecommunications system anchor base station of claim 1, wherein the beam information further includes line of sight information for the specific beam.

5. The mobile telecommunications system anchor base station of claim 1, wherein the beam information identifies the specific beam.

6. The mobile telecommunications system anchor base station of claim 1, wherein the circuitry is further configured to obtain geolocation information of a user equipment.

7. The mobile telecommunications system anchor base station of claim 1, wherein the circuitry is further configured to transmit system information for the specific beam to a user equipment, the user equipment being in a radio resource control connected state.

8. The mobile telecommunications system anchor base station of claim 1, wherein the circuitry is further configured to transmit neighboring cell list information indicating neighboring cells.

9. The mobile telecommunications system anchor base station of claim 1, wherein the communication in the mobile telecommunications system is distributed at least over a control plane and a user plane, wherein signaling is communicated over the control plane and user data are communicated over the user plane, and wherein the circuitry is further configured to transmit system information over the control plane and the user plane.

10. A mobile telecommunications system slave base station for a mobile telecommunications system including at least one anchor cell and at least one slave cell being associated with the anchor cell, the slave base station comprising circuitry being configured to:
transmit system information for a specific beam based on beam information, the specific beam to be used to transmit data between the slave base station and the at least one anchor cell.

11. The mobile telecommunications system slave base station of claim 10, wherein the communication in the mobile telecommunications system is distributed at least over a control plane and a user plane, wherein signaling is communicated over the control plane and user data are communicated over the user plane, and wherein the circuitry is further configured to transmit system information over the user plane.

12. A user equipment connected to at least one anchor cell and at least one slave cell of a mobile telecommunications system, the mobile telecommunications system comprising the anchor cell configured to communicate with at least one user equipment and at least one slave cell, the at least one slave cell being established by a slave base station and being configured to communication with at least user equipment and an anchor base station, the user equipment comprising a circuitry being configured to:
obtain geolocation information of the user equipment; and
receive system information from a specific beam, based on the geolocation information, the specific beam to be used to transmit data between the user equipment and the slave base station or between the user equipment and the anchor base station.

13. The user equipment of claim 12, wherein the circuitry is further configured to receive system information including beam information about the specific beam.

14. The user equipment of claim 13, wherein the beam information further includes coverage information of the specific beam.

15. The user equipment of claim 13, wherein the beam information further includes line of sight information.

16. The user equipment of claim 13, wherein the beam information identifies the specific beam.

17. The user equipment of claim 13, wherein the circuitry is further configured to receive updated system information based on the beam information.

18. The user equipment of claim 13, wherein the circuitry is further configured to receive system information from a specific anchor cell or slave cell, based on the beam information.

19. The user equipment of claim 12, wherein the specific beam is an anchor cell beam or slave cell beam.

20. The user equipment of claim 12, wherein the circuitry is further configured to receive system information including scheduling information and to receive system information from the specific beam, based on the scheduling information.

21. The user equipment of claim 12, wherein the circuitry is further configured to receive system information including neighboring cell list information and to switch to a neighboring cell based on the neighboring cell list information.

* * * * *